US011285602B2

(12) United States Patent
Hane et al.

(10) Patent No.: US 11,285,602 B2
(45) Date of Patent: Mar. 29, 2022

(54) ADJUSTMENT SUPPORT DEVICE

(71) Applicant: FANUC CORPORATION, Yamanashi (JP)

(72) Inventors: Mikito Hane, Yamanashi (JP); Takashi Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 123 days.

(21) Appl. No.: 16/889,807

(22) Filed: Jun. 2, 2020

(65) Prior Publication Data

US 2020/0398423 A1 Dec. 24, 2020

(30) Foreign Application Priority Data

Jun. 19, 2019 (JP) .............................. JP2019-114072

(51) Int. Cl.
*B25J 9/16* (2006.01)
*B25J 13/08* (2006.01)

(52) U.S. Cl.
CPC ............. *B25J 9/163* (2013.01); *B25J 13/085* (2013.01)

(58) Field of Classification Search
CPC ........ B25J 9/163; B25J 13/085; B25J 9/1633; B25J 9/1661; G05B 2219/40032; G05B 2219/40033; G05B 2219/33056
USPC ................................................ 700/245–264
See application file for complete search history.

(56) References Cited

U.S. PATENT DOCUMENTS

| | | | | |
|---|---|---|---|---|
| 8,369,983 B2* | 2/2013 | Sato | ....................... | B25J 9/1687 700/220 |
| 9,008,836 B2* | 4/2015 | Zhang | .................... | B25J 9/1687 700/245 |
| 9,811,074 B1* | 11/2017 | Aichele | ..................... | G06N 7/04 |
| 10,576,635 B2* | 3/2020 | Ogawa | ..................... | B25J 5/007 |
| 2007/0210740 A1 | 9/2007 | Sato et al. | | |
| 2010/0145509 A1* | 6/2010 | Zhang | .................... | B25J 9/1687 700/245 |
| 2010/0211204 A1* | 8/2010 | Zhang | .................... | B25J 9/1687 700/104 |
| 2014/0188281 A1* | 7/2014 | Nagai | .................... | B25J 9/0081 700/264 |
| 2018/0222058 A1* | 8/2018 | Mizobe | .................... | B25J 9/163 |

(Continued)

FOREIGN PATENT DOCUMENTS

JP 2007237312 A 9/2007

*Primary Examiner* — Jaime Figueroa
(74) *Attorney, Agent, or Firm* — Hauptman Ham, LLP

(57) ABSTRACT

An adjustment support device includes: a storage unit for storing, with force state data and position data in an operation when performing force control of the industrial robot as a state variable and with data indicating a result of determining whether a result of the force control is success or failure based on predetermined criteria as determination data, a learning model generated by machine learning; an analysis unit for analyzing the learning model to analyze, for a control parameter used when the force control of the industrial robot has failed, an adjustment method of the control parameter for improving a degree of success of the force control; and an adjustment determination unit for determining, based on a result of the analysis by the analysis unit, an adjustment method of the control parameter in the force control used when the force control has failed and outputting the adjustment method.

2 Claims, 8 Drawing Sheets

(56) References Cited

U.S. PATENT DOCUMENTS

2018/0225113 A1* 8/2018 Hasegawa ................ B25J 9/161
2018/0272535 A1* 9/2018 Ogawa ................... B25J 9/1692

* cited by examiner

✗ :CONTROL PARAMETER WHEN FORCE CONTROL FAILS

⇨ :DIRECTION IN WHICH CONTROL PARAMETER IS TO BE ADJUSTED

✗ :CONTROL PARAMETER WHEN FORCE CONTROL FAILS

⇨ :DIRECTION IN WHICH CONTROL PARAMETER IS TO BE ADJUSTED

FEED DIRECTION

FEED DIRECTION

ADJUSTMENT SUPPORT DEVICE

RELATED APPLICATIONS

The present application claims priority to Japanese Patent Application Number 2019-114072 filed Jun. 19, 2019, the disclosure of which is hereby incorporated by reference herein in its entirety.

BACKGROUND OF THE INVENTION

1. Field of the Invention

The present disclosure relates to an adjustment support device and in particular, to an adjustment support device relevant to control parameter setting in force control of a robot.

2. Description of the Related Art

Work, such as fitting between precisely machined components, gear phase matching, deburring, and polishing, may be performed by a robot having a force sensor. Such work is realized by causing a robot to grip a component or a tool and controlling (force control) a force in a predetermined direction to be a desired value. As such force control methods, impedance control, damping control, hybrid control, and the like are known. In any control method, it is necessary to manually set an appropriate control gain. In addition, a method of automatically adjusting the control gain is known (for example, JP 2007-237312 A).

As described above, a method of setting the control gain in force control is known. However, other parameters, such as an appropriate pressing force, an appropriate traveling speed, and an appropriate traveling direction, depend on adjustment performed by an operator. When such parameter adjustment fails, it is difficult to determine which control parameter should be changed to solve the problem.

Therefore, there is a demand for an adjustment support device that performs adjustment support based on control parameters used in force control performed in the past when parameter adjustment in force control fails.

SUMMARY OF THE INVENTION

An adjustment support device according to an aspect of the present disclosure solves the aforementioned problem by constructing a learning model, by which the characteristics of control parameters when force control is performed are calculated from control parameters used in the force control performed in the past and determination data indicating the result of the force control, by machine learning and supporting the adjustment of the control parameters using the learning model.

In addition, according to an aspect of the present disclosure, there is provided an adjustment support device for supporting an adjustment of an operation of an industrial robot having a function of detecting a force and a moment applied to a manipulator. The adjustment support device includes: a learning model storage unit for storing, with force state data and position data in an operation when performing force control of the industrial robot as a state variable and with data indicating a result of determining whether a result of the force control performed under the state is success or failure based on predetermined criteria as determination data, a learning model generated by machine learning; an analysis unit for analyzing the learning model to analyze, for a control parameter used when the force control of the industrial robot has failed, an adjustment method of the control parameter for improving a degree of success of the force control; and an adjustment determination unit for determining, based on a result of the analysis by the analysis unit, an adjustment method of the control parameter in the force control used when the force control has failed and outputting the adjustment method.

According to one aspect of the present disclosure, when force control fails, even an operator who is not accustomed to adjusting control parameters can perform appropriate control parameter adjustment in force control.

BRIEF DESCRIPTION OF THE DRAWINGS

The above objects and features of the present disclosure will become apparent from the following description of embodiments with reference to the accompanying diagrams.

DETAILED DESCRIPTION OF THE PREFERRED EMBODIMENTS

Hereinafter, embodiments of the present disclosure will be described with reference to the diagrams.

Figure 1:
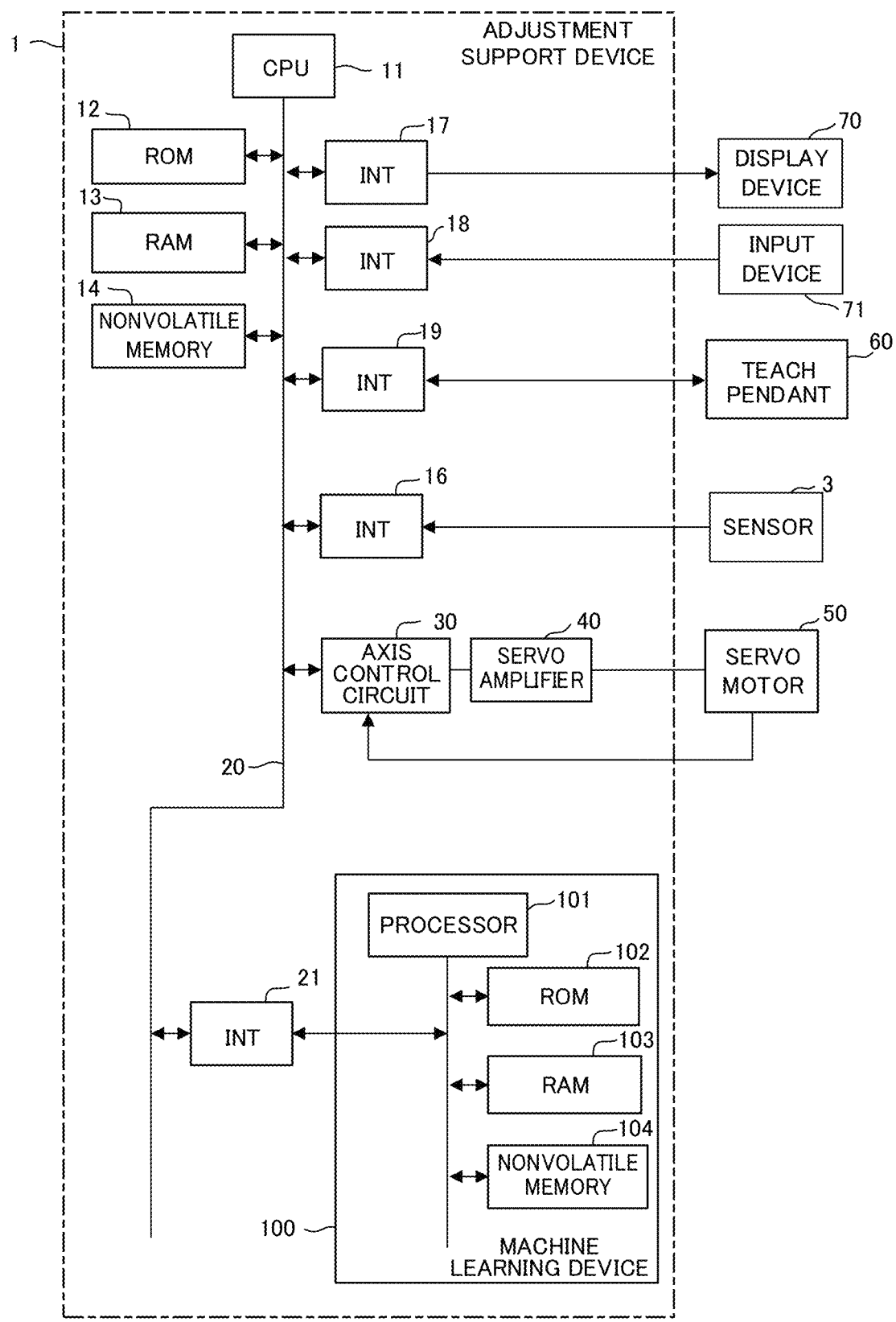
FIG. 1 is a schematic hardware configuration diagram of an adjustment support device according to an embodiment.

FIG. 1 is a schematic hardware configuration diagram illustrating an adjustment support device according to an embodiment. An adjustment support device 1 can be implemented in, for example, a controller (robot controller) for controlling a robot. In addition, the adjustment support device 1 can be implemented in, for example, a personal computer attached together to a controller that controls a robot. The adjustment support device 1 can be implemented in a computer, such as a cell computer, an edge computer, a fog computer, and a cloud server, connected to the controller through a wired/wireless network. In the present embodiment, an example in which the adjustment support device 1 is implemented in a controller that controls a robot is illustrated.

A central processing unit (CPU) 11 included in the adjustment support device 1 according to the present embodiment is a processor that performs overall control of the adjustment support device 1. The CPU 11 reads out a system program stored in a read only memory (ROM) 12 through a bus 20 and controls the entire adjustment support device 1 according to the system program. A random access memory (RAM) 13 temporarily stores temporary calculation data, various kinds of data input by an operator through a teach pendant 60 or an input device 71, and the like.

A nonvolatile memory 14 includes, for example, a memory backed up by a battery (not illustrated) and a solid state drive (SSD). The storage state of the nonvolatile memory 14 is maintained even when the power of the adjustment support device 1 is turned off. The nonvolatile memory 14 stores teaching data, which is input from the teach pendant 60 through an interface 19, or data input from the input device 71. The nonvolatile memory 14 stores an industrial robot control program input through an interface (not illustrated). In addition, data (force or moment applied to a manipulator) detected by a sensor 3 attached to an industrial robot is input to the nonvolatile memory 14 through an interface 16. The nonvolatile memory 14 stores the data input through the interface 16. In addition, the nonvolatile memory 14 stores data (current value, position, speed, acceleration, torque, and the like of a servo motor 50) detected from the servo motor 50 that drives the axis of the industrial robot. The nonvolatile memory 14 stores data and the like read through a network or an external storage device (not illustrated). Programs or various kinds of data stored in the nonvolatile memory 14 may be loaded to the RAM 13 at the time of execution/use. In addition, various system programs for executing processes relevant to robot control or teaching on the teaching position (including a system program for controlling transmission and reception to and from a machine learning device 100 described later) are written in the ROM 12 in advance.

Data read into the memory and data obtained as an execution result of a program or the like are input to a display device 70 through an interface 17 and displayed on the display device 70. In addition, data and the like output from the machine learning device 100 described later are input to the display device 70 through the interface 17 and displayed on the display device 70. In addition, the input device 71 includes a keyboard, a pointing device, and the like. The input device 71 transmits commands, data, and the like based on the operation of the operator to the CPU 11 through an interface 18.

The teach pendant 60 is a manual data input device including a display, a handle, hardware keys, and the like. The teach pendant 60 receives information from the adjustment support device 1 through the interface 19 and displays the information. The teach pendant 60 transmits pulses, commands, and various kinds of data input from a handle, hardware keys, and the like to the CPU 11.

An axis control circuit 30 controls an axis such as a joint provided in the industrial robot. The axis control circuit 30 receives an axis movement command amount from the CPU 11 and outputs an axis movement command to a servo amplifier 40. The servo amplifier 40 drives a servo motor 50 in response to this command. The servo motor 50 moves an axis provided in the robot. The servo motor 50 has built-in position and speed detectors. The servo motor 50 feeds back the position and speed feedback signals from the position and speed detectors to the axis control circuit 30 to perform position and speed feedback control. In addition, in the hardware configuration diagram of FIG. 1, only one axis control circuit 30, one servo amplifier 40, and one servo motor 50 are illustrated. In practice, however, the axis control circuit 30, the servo amplifier 40, and the servo motor 50 may be provided as many as the axes provided in the robot to be controlled. For example, in the case of a robot having six axes, the axis control circuit 30, the servo amplifier 40, and the servo motor 50 are provided for each of the axes.

An interface 21 is an interface for connecting each unit of the adjustment support device 1 with the machine learning device 100. The machine learning device 100 includes a processor 101 that controls the entire machine learning device 100. The machine learning device 100 includes a ROM 102 that stores a system program and the like. The machine learning device 100 includes a RAM 103 for performing temporary storage in each process relevant to machine learning. The machine learning device 100 includes a nonvolatile memory 104 used for storing a learning model and the like. The machine learning device 100 can observe information (force or moment applied to the manipulator and the current value, position, speed, acceleration, torque, and the like of the servo motor 50) that can be acquired by the adjustment support device 1 through the interface 21. In addition, the adjustment support device 1 receives an instruction on an adjustment target and an adjustment direction of a force control parameter, which is output from the machine learning device 100, and adjusts a robot control command based on a program or teaching data.

Figure 2:
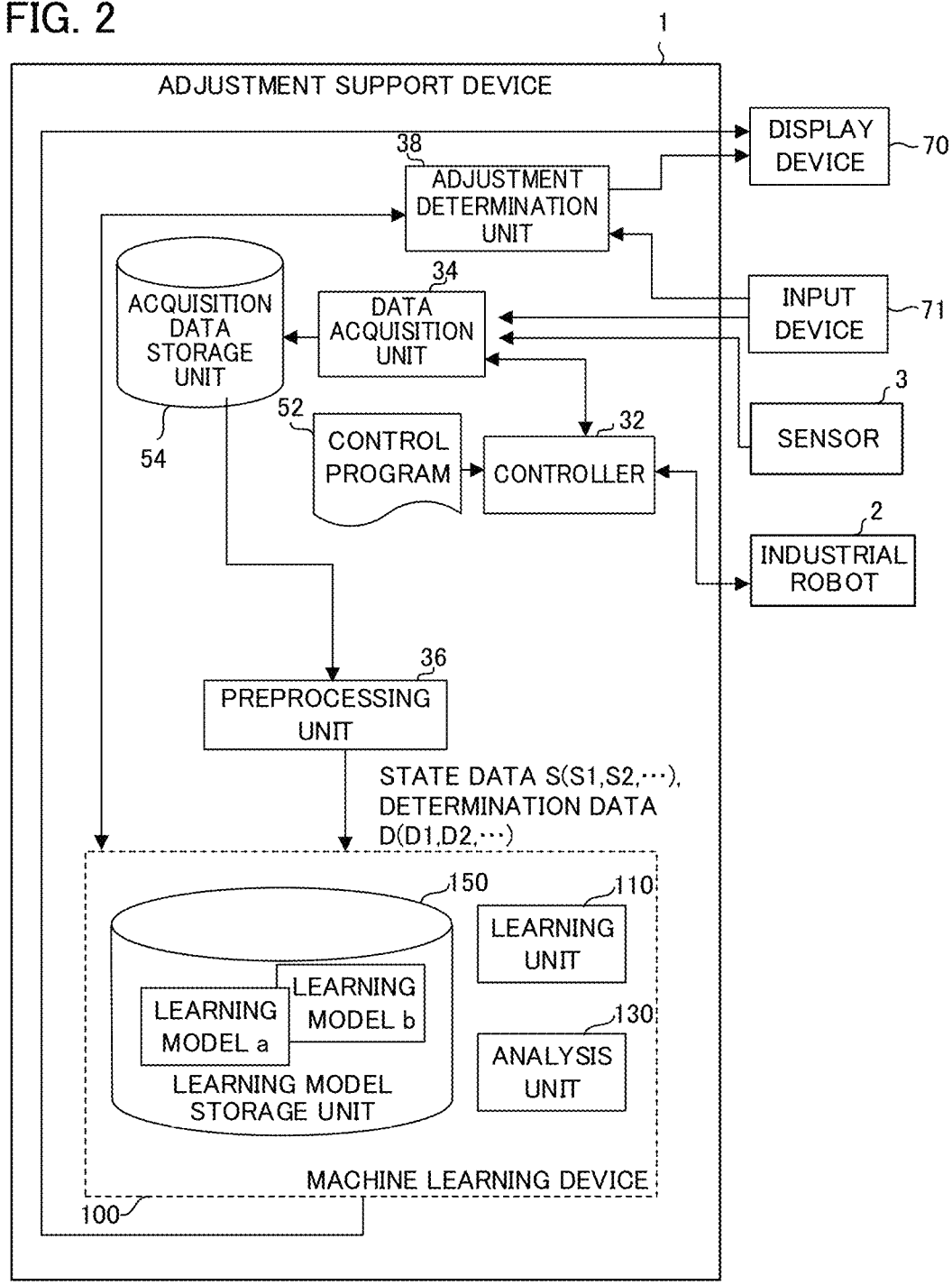
FIG. 2 is a schematic functional block diagram of a controller according to a first embodiment.

FIG. 2 is a schematic functional block diagram of the adjustment support device 1 and the machine learning device 100 according to a first embodiment. Each function of the functional block illustrated in FIG. 2 is achieved when the CPU 11 provided in the adjustment support device 1 and the processor 101 of the machine learning device 100 illustrated in FIG. 1 execute each system program to control the operation of each unit of the adjustment support device 1 and the machine learning device 100.

The adjustment support device 1 according to the present embodiment includes a controller 32, a data acquisition unit 34, a preprocessing unit 36, and an adjustment determination unit 38. The machine learning device 100 provided in the adjustment support device 1 includes a learning unit 110 and an analysis unit 130. In addition, an acquisition data storage unit 54 that stores data acquired from an industrial robot 2, the sensor 3, and the like is provided on the nonvolatile memory 14. A learning model storage unit 150 that stores at least one learning model constructed by machine learning of the learning unit 110 is provided on the nonvolatile memory 104 of the machine learning device 100.

The controller 32 controls the industrial robot 2 based on a control operation on a control panel (not illustrated) by the operator or a control program stored in the nonvolatile memory 14 or the like. For example, when the movement of each axis (joint) of the industrial robot 2 is instructed by a control program 52, the controller 32 outputs command data as a change amount of the axis angle to the motor for driving the axis in each control cycle. That is, the controller 32 has a general control function required for controlling each unit of the industrial robot 2. In addition, the controller 32 acquires the motor state quantity (current value, position, speed, acceleration, torque, and the like of each motor) of each motor provided in the industrial robot 2, and outputs the data to the data acquisition unit 34.

The data acquisition unit 34 acquires various kinds of data from the industrial robot 2, the sensor 3, the input device 71, and the like. The data acquisition unit 34 acquires, for example, a command by a program for controlling an industrial robot or information regarding a force or a moment applied to the manipulator of the industrial robot 2. The data acquisition unit 34 acquires the current value, position, speed, acceleration, torque, and the like of the servo motor 50 for driving the axis of the industrial robot 2. The data acquisition unit 34 stores the acquisition data in the acquisition data storage unit 54. The data acquisition unit 34 may acquire data detected by the sensor 3 or data relevant to the servo motor 50 as time-series data. In addition, the data acquisition unit 34 may acquire a control parameter relevant to force control input by the operator through the input device 71 or information (determination data) relevant to a determination result with respect to a result of the force control. The data acquisition unit 34 may acquire data from another computer through a wired/wireless network or an external storage device (not illustrated).

Figure 3:
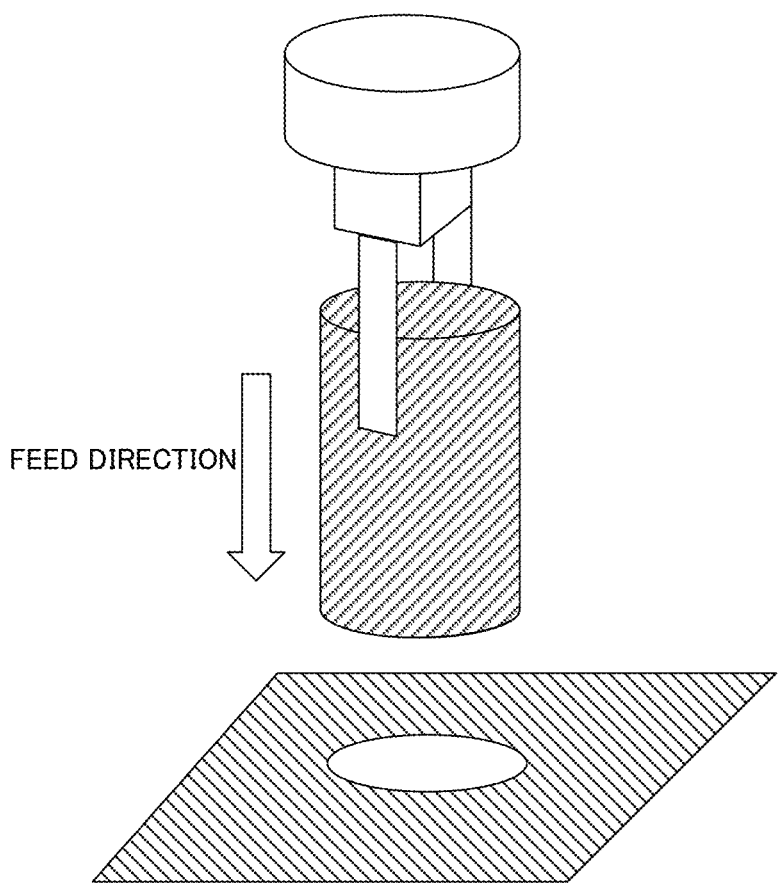
FIG. 3 is a diagram illustrating an example of a component fitting operation performed by an industrial robot.

The acquisition data that is acquired by the data acquisition unit 34 is given determination data. The determination data is data for classifying the acquisition data according to predetermined criteria. The determination data acquired by the data acquisition unit 34 is used to classify data used for control to insert a columnar component into a cylinder as illustrated in FIG. 3. FIG. 3 illustrates an example of determining the success or failure of column fitting in which a columnar component is inserted into a cylindrical hole. In this example, a threshold value $t_{lim1}$, a threshold value $t_{lim2}$, and a threshold value $t_{lim3}$ relevant to the time are set in advance. The threshold value $t_{lim1}$, the threshold value $t_{lim2}$, and the threshold value $t_{lim3}$ satisfy the relationship of threshold value $t_{lim1}$<threshold value $t_{lim2}$<threshold value $t_{lim3}$. If a time t required for the column to fit to the target depth in the cylindrical hole is less than $t_{lim1}$, it is determined that the degree of success is "high". If the time t required for the column to fit to the target depth in the cylindrical hole is equal to or longer than $t_{lim1}$ and less than $t_{lim2}$, it is determined that the degree of success is "medium". If the time t required for the column to fit to the target depth in the cylindrical hole is equal to or longer than $t_{lim2}$ and less than $t_{lim3}$, it is determined that the degree of success is "low". If the column does not fit to the target depth in the cylindrical hole within the $t_{lim3}$, determination as "failure" is made. In this manner, the data acquired by the data acquisition unit 34 is given determination data relevant to classification indicating the determination result of the force control, such as "success" or "failure", based on the predetermined criteria. In addition, the data acquired by the data acquisition unit 34 may also be given determination data relevant to sub-classifications into which each classification, such as "success" or "failure", is subdivided based on other predetermined criteria. In addition, the determination data may be automatically created by the data acquisition unit 34 based on predetermined criteria given in advance (the above-described threshold values and determination expressions). In the example described above, determination data relevant to sub-classifications into which the classification of "success" is further subdivided on a time basis is given. For example, the classification of "success" may be subdivided into sub-classifications based on carefulness. In addition, determination data subdivided by sub-classifications based on speed (classification according to the time taken until the work is completed) may be given. In addition, determination data relevant to sub-classifications into which the classification of "failure" is subdivided according to the degree of wrenching (classification according to the maximum value of the force applied to the distal end portion of the robot) or the accuracy (classification according to the accuracy of the position of the distal end portion of the robot) may be given.

Figure 4:
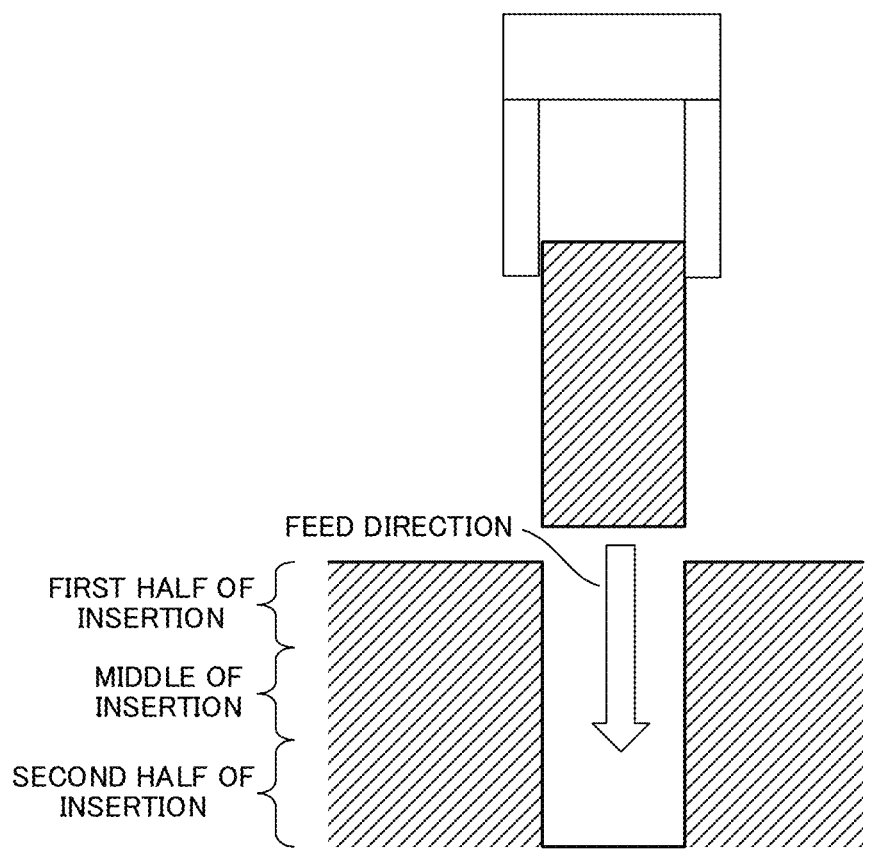
FIG. 4 is a diagram illustrating an example in which phases of an operation in a component fitting operation performed by an industrial robot are divided.

In addition, determination data obtained by dividing one operation of the industrial robot 2 into a plurality of phases and then performing classification according to individual criteria in each phase may be given. For example, in column fitting in which a column is inserted into a cylindrical hole, as illustrated in FIG. 4, the position of the columnar component is adjusted in the first half of the fitting operation, and the magnitude of the force in the fitting direction (pressing direction) is adjusted in the second half of the fitting operation. That is, force control parameters that are regarded as important in the respective phases are different. In order to cope with such a case, for predetermined data included in the acquisition data, the phase of force control is divided for each predetermined value or range. In addition, determination data in which an operation in each phase is classified based on predetermined criteria may be given. For example, in column fitting, the phase of the fitting operation may be divided by setting a plurality of values or ranges for the moving distance in the depth direction. In an operation using another force control, the phase of the operation may be divided according to, for example, the position of the distal end portion of the robot. In addition, the above-described values or ranges may be appropriately set by, for example, a skilled operator.

The preprocessing unit 36 creates learning data used for learning of the machine learning device 100 based on the acquisition data for machine learning acquired by the data acquisition unit 34. The preprocessing unit 36 creates state data by converting (digitizing, sampling, and the like) the data acquired by the data acquisition unit 34 into a unified format handled by the machine learning device 100.

State data S created by the preprocessing unit 36 may include force state data S1 and position data S2. The force state data S1 includes, for example, information regarding a force (a target pressing force, a force actually applied, and the like) applied to the manipulator when the manipulator of the industrial robot 2 is force-controlled. The position data S2 includes information regarding the speed of the manipulator (a target speed command value, data indicating the transition of the position, and the like). In this case, the force state data S1 includes at least data of the force in the feed direction applied to the manipulator of the industrial robot 2. The force state data S1 may include data of the force applied in a direction other than the feed direction or the moment of the force. The force state data S1 may be obtained from a command value or a set value for the industrial robot 2. The force state data S1 may be comprehensively obtained from the sensor 3 provided in the manipulator of the industrial robot 2, the current flowing through the servo motor 50 for driving each axis, and the like. The position data S2 includes at least data indicating the transition of the position of the manipulator set in the force state indicated by the predetermined force state data S1. The position data S2 may further include a speed, an acceleration, a target feed speed command value, and a control command in a direction other than the feed direction that are calculated from the transition of the position.

In addition, the determination data stored in the acquisition data storage unit 54 may be used as it is for determination data D used by the preprocessing unit 36 as learning data.

When the force control based on the set control parameter fails, the adjustment determination unit 38 instructs the machine learning device 100 to perform an analysis based on the acquisition data stored in the acquisition data storage unit 54. The adjustment determination unit 38 determines an adjustment target and an adjustment direction of the control parameter based on the analysis result, and outputs the determined information. For example, when notification that the force control of the industrial robot 2 has failed is given from the operator through the input device 71, the adjustment determination unit 38 analyzes a learning model generated by performing machine learning by the learning unit 110 of the machine learning device 100 using the acquisition data stored in the acquisition data storage unit 54. From the analysis result, the adjustment determination unit 38 determines which of the control parameters set at the time of failure can be adjusted to make the force control successful. The adjustment determination unit 38 outputs the obtained result to, for example, the display device 70 for display.

The learning unit 110 performs machine learning using the data created by the preprocessing unit 36. The learning unit 110 generates a learning model, which has learned a relationship between the operation state of the industrial robot 2 adjusted by the operator and the determination of the success or failure of the operation, using a known machine learning method such as supervised learning. The learning unit 110 stores the generated learning model in the learning model storage unit 150. Examples of the supervised learning method performed by the learning unit 110 include a linear regression method, a multilayer perceptron method, a recurrent neural network method, a long short-term memory method, and a convolutional neural network method.

The learning unit 110 performs supervised learning using, as learning data, the state data S and the determination data D as label data. With this learning, the learning unit 110 can create a learning model that determines a boundary for determining the success/failure of the operation of the industrial robot 2 (that is, success/failure of the adjustment operation by the operator) and a boundary for determining the degree of success or the degree of failure.

In addition, the learning unit 110 is not necessarily required when learning is completed and the required learning model is stored in the learning model storage unit 150. For example, when the manufacturer ships the adjustment support device 1 to a customer, the learning unit 110 may be removed from the adjustment support device 1.

In response to the command from the adjustment determination unit 38, the analysis unit 130 analyzes which of the control parameters used when the force control of the industrial robot 2 has failed should be adjusted to make the force control successful, based on the learning model stored in the learning model storage unit 150. For example, the analysis unit 130 analyzes which of the control parameters among the control gain, the pressing force of the manipulator corresponding to the force state data S1, and the traveling speed and the traveling direction of the manipulator corresponding to the position data S2 should be adjusted to what extent to make the failed force control successful.

Hereinafter, a learning model generated by the learning unit 110 and analysis processing of the analysis unit 130 will be described using the cylinder fitting operation illustrated in FIG. 3 as an example.

Based on the acquisition data stored in the acquisition data storage unit 54, the learning unit 110 generates a learning model using, for example, a regression formula expressed by the following Formula (1) as a model. In addition, in Formula (1), $p_i$ (i=1, 2, 3, represents a control parameter set when the manipulator of the industrial robot 2 is force-controlled, and Q is defined as a weight indicating the degree of success.

$$Q = f(p_1, p_2, p_3, \ldots) \qquad (1)$$

The learning unit 110 may generate a learning model based on acquisition data, to which determination data indicating a determination result determined based on predetermined criteria is given, among the pieces of acquisition data stored in the acquisition data storage unit 54. For example, the learning unit 110 may generate a learning model a using acquisition data to which determination data relevant to sub-classifications based on carefulness (carefulness is "high", "medium", "low", and the like) is given, among the pieces of acquisition data acquired when the force control in the cylinder fitting operation is successful, and store the learning model a in the learning model storage unit 150. In addition, the learning unit 110 may generate a learning model b using acquisition data to which determination data relevant to sub-classifications based on the speed (speed is "high", "medium", "low", and the like) is given, and store the learning model b in the learning model storage unit 150. In addition, the learning unit 110 may further generate a learning model for each sub-classification into which acquisition data is subdivided based on predetermined criteria. For example, for acquisition data to which determination data based on carefulness in the cylinder fitting operation is given, the learning unit 110 may generate a learning model a1 based on acquisition data to which determination data relevant to the sub-classification with carefulness of "high" is given, generate a learning model a2 based on acquisition data to which determination data relevant to the sub-classification with carefulness of "medium" is given, generate a learning model a3 based on acquisition data to which determination data relevant to the sub-classification with carefulness of "low" is given, and store the learning models a1, a2, and a3 in the learning model storage unit 150.

When such learning models are stored in the learning model storage unit 150, if there is a command from the adjustment determination unit 38 regarding the value of the control parameter when the force control of the manipulator fails and the criteria of the control parameter adjustment, the analysis unit 130 selects, from the learning models stored in the learning model storage unit 150, a learning model that is generated based on the same criteria as the control parameter adjustment criteria included in the command of the adjustment determination unit 38. By analyzing the selected learning model, the adjustment determination unit 38 analyzes which of the control parameters used when the force control of the industrial robot 2 has failed should be adjusted to make the force control successful.

Figure 5:
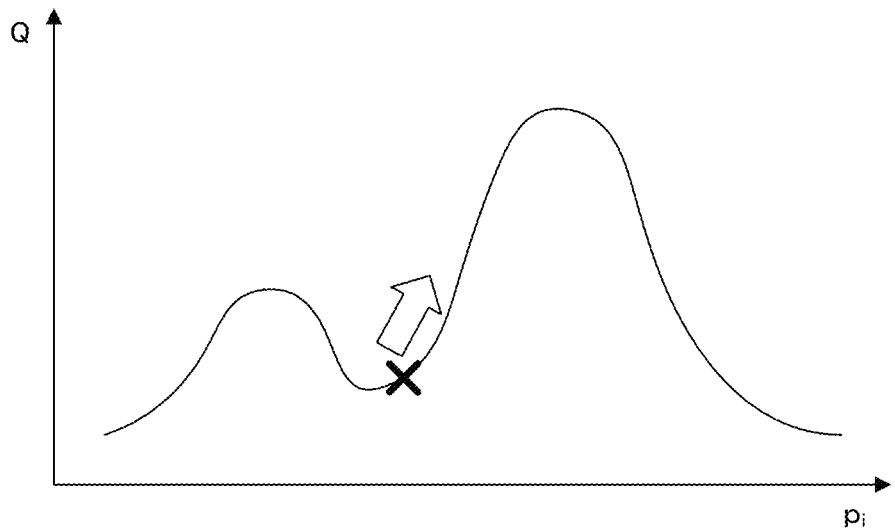
FIG. 5 is a diagram showing an operation example of an analysis unit.

As an example of the analysis processing, the analysis unit 130 may determine an adjustment target of a control parameter based on the change tendency of the degree of success Q on the regression formula selected as a learning model. In a case where such an analysis method is used, first, the analysis unit 130 specifies a position on the regression formula of each control parameter acquired when the force control has failed. Then, the analysis unit 130 calculates the inclination of each control parameter at the specified position on the regression formula. Then, the analysis unit 130 compares the calculated inclinations of the respective control parameters, and determines a control parameter having the largest inclination as a control parameter to be adjusted. For example, as shown in FIG. 5, the analysis unit 130 fixes a parameter $p_j$ (j≠i) other than a parameter $p_i$ to a value used when the force control has failed, thereby creating a formula of the degree of success Q and $p_i$. Then, the analysis unit 130 calculates the inclination of the formula at the position of the value of $p_i$ used when the force control has failed. Such processing may be performed for each control parameter $p_j$ to select, as a control parameter to be adjusted, a control parameter having the largest inclination at the position of the value used when the force control has failed, in the regression formula selected as a learning model. Then, the adjustment determination unit 38 is notified of the control parameter to be adjusted, which has been selected by the analysis unit 130, so that the control parameter is adjusted in an adjustment direction in which the degree of success Q increases and by a predetermined value.

Figure 6:
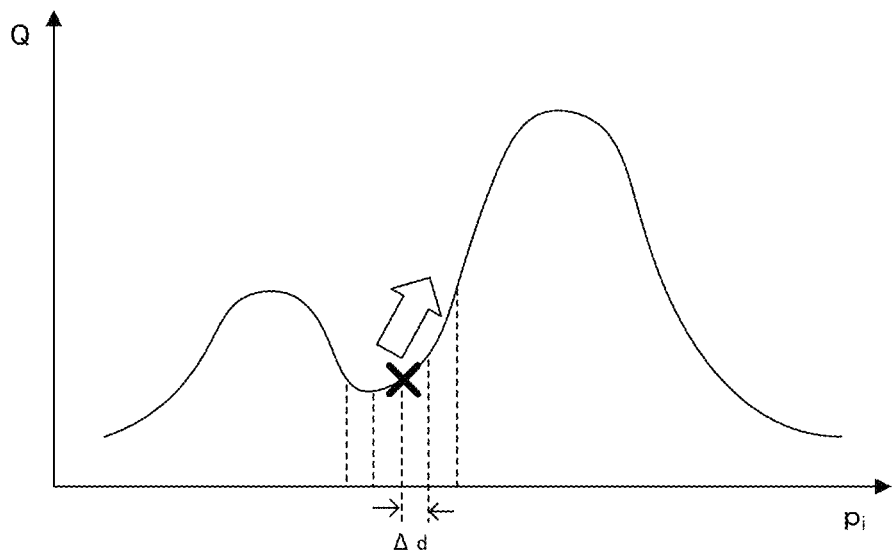
FIG. 6 is a diagram showing another operation example of the analysis unit.

As another example of the analysis processing, the analysis unit 130 may determine an adjustment target of a control parameter based on the change tendency of the degree of success Q with respect to the variation of a predetermined control parameter on the regression formula selected as a learning model. In a case where such an analysis method is used, first, the analysis unit 130 specifies a position on the regression formula of each control parameter acquired when the force control has failed. Then, the analysis unit 130 calculates a change in the degree of success Q when each control parameter is changed by a predetermined variation in the vicinity of the specified position. Then, the analysis unit 130 performs comparison of the tendency of the change in the degree of success Q with respect to the calculated variation of the control parameter, and determines a control parameter that has a largest change in the degree of success Q with respect to the control parameter variation (that can improve the degree of success Q efficiently) as a control parameter to be adjusted. For example, as shown in FIG. 6, the analysis unit 130 fixes a parameter $p_j$ ($j \neq i$) other than a parameter $p_i$ to a value used when the force control has failed, thereby creating a formula of Q and $p_i$. Then, the analysis unit 130 analyzes the change tendency of the degree of success Q near the value of $p_i$ when the force control has failed by calculating the value of the degree of success Q when changed for each predetermined variation $\Delta d$ with the value of $p_i$ used when the force control has failed as a reference. Such processing may be performed for each control parameter to select a control parameter capable of increasing the degree of success Q most efficiently at the position of the value of $p_i$ used when the force control has failed, in the regression formula selected as a learning model, as a control parameter to be adjusted. Then, the adjustment determination unit 38 is notified of the control parameter to be adjusted, which has been selected by the analysis unit 130, so that the control parameter is adjusted in an adjustment direction in which the degree of success Q increases and by a predetermined value. This analysis method can be used even when a neural network or the like is used as a learning model.

In addition, for the analysis processing of the analysis unit 130, any method capable of grasping the change tendency of the degree of success Q near the value of the control parameter by which the force control has failed, such as a known mathematical analysis method and a known geometric method, may be adopted according to the type of learning model or the like.

In the adjustment support device 1 having the above-described configuration, when the force control of the industrial robot 2 fails, a learning model generated based on the acquisition data acquired in the past as to how to adjust control parameters in order to make the force control successful is analyzed, and the operator is notified of the result. Therefore, even an inexperienced operator can efficiently adjust the control parameters in the force control of the industrial robot 2.

Figure 7:
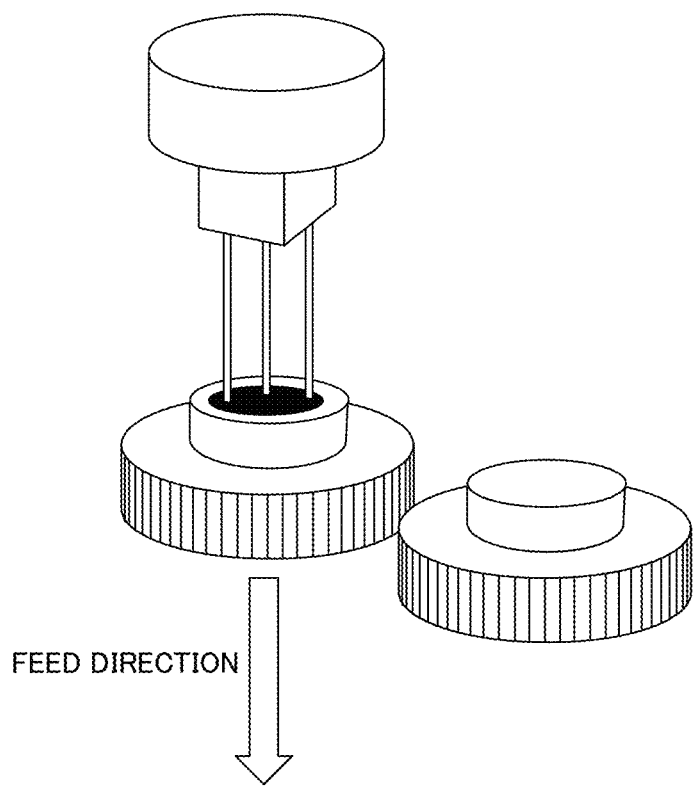
FIG. 7 is a diagram illustrating an example of a gear assembling operation performed by an industrial robot.
Figure 8:
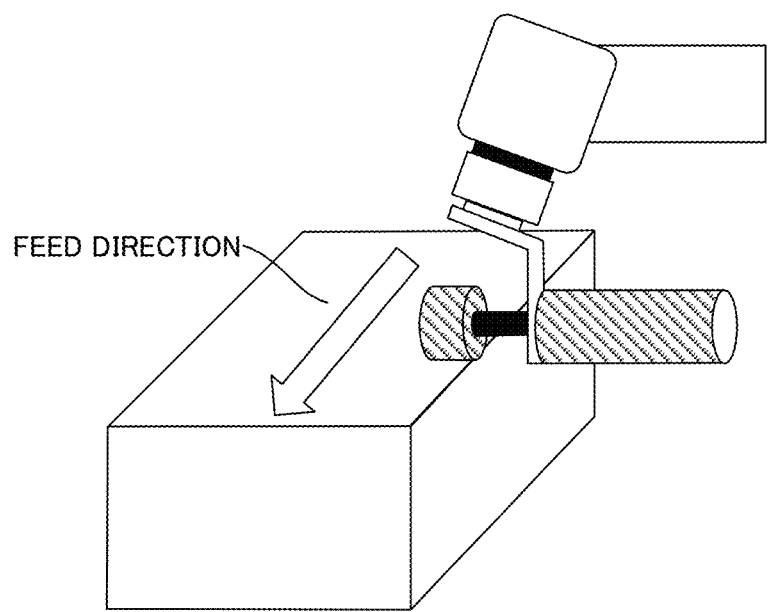
FIG. 8 is a diagram illustrating an example of an operation of deburring and polishing a work using an industrial robot.

In addition to the fitting operation illustrated in FIG. 3, for example, as illustrated in FIG. 7, the adjustment support device 1 according to the present embodiment can be applied to an operation of assembling gears while gripping a gear with a manipulator attached to the industrial robot 2 and adjusting the phase of the gear with respect to the other gear. In addition, as illustrated in FIG. 8, the adjustment support device 1 can also be applied to an operation of deburring or polishing a work with a polishing tool attached to the industrial robot 2 instead of an end effector unit (a hand unit, a distal end portion, or the like) of the manipulator.

As a modification example of the present embodiment, the analysis unit 130 may notify the adjustment determination unit 38 of a plurality of control parameters with priorities as control parameters to be adjusted. In this case, for example, at the position of the value of $p_i$ of the control parameter used when the force control has failed, the adjustment determination unit 38 may be notified of a plurality of control parameters in descending order of the inclination as adjustment targets.

As another modification example of the present embodiment, as the state data S used for the learning of the learning unit 110, in addition to the force state data and the position state data acquired from the industrial robot 2 and the sensor 3, various kinds of data such as a control gain in force control, the mass of a tool attached to the distal end of the robot, a gap distance between a workpiece and a tool, a coefficient of friction, temperature, and force sensor characteristics may be added to state data S to perform machine learning.

Figure 9:
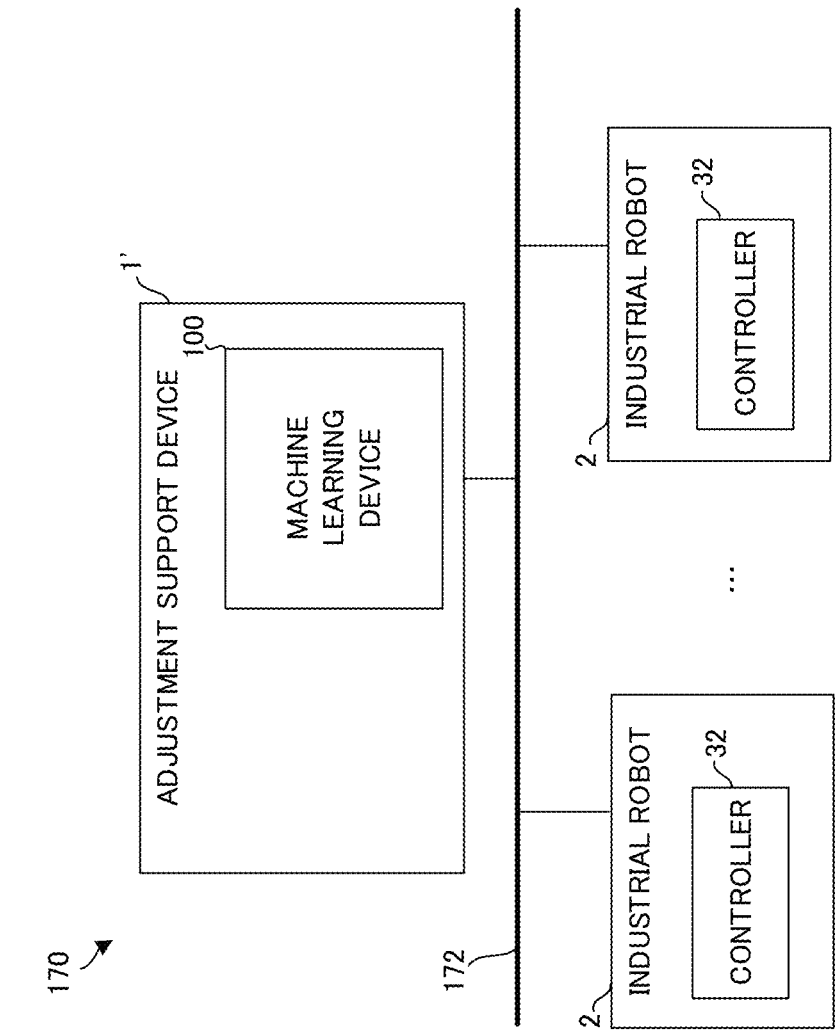
FIG. 9 is a schematic functional block diagram of a controller according to a second embodiment.

FIG. 9 illustrates a system 170 according to a second embodiment including an adjustment support device 1'. The system 170 includes: the adjustment support device 1' implemented as a computer, such as a cell computer, a fog computer, a host computer, or a cloud server; at least one industrial robot 2 including a controller 32 (robot controller); and a wired/wireless network 172 for connecting the adjustment support device 1' with the industrial robot 2.

The adjustment support device 1' according to the present embodiment is different from the adjustment support device 1 according to the first embodiment in that the adjustment support device 1' has functions other than the controller 32 among the functions described in FIG. 2. In the system 170 having the above-described configuration, the adjustment support device 1' collects, through the network 172, acquisition data acquired when each industrial robot 2 is operating. The adjustment support device 1' performs machine learning using the collected acquisition data to generate a learning model.

Then, in response to a request for adjustment support of a control parameter when force control fails that is sent from an operator using each industrial robot 2, the adjustment support device 1' analyzes the control parameter to be adjusted and the adjustment method thereof, and returns the analysis result to each industrial robot 2.

In the system 170 according to the present embodiment, for example, the adjustment support device 1' is implemented in a fog computer installed for a plurality of industrial robots 2 as edge computers. Therefore, adjustment support of the control parameter in the force control of each industrial robot 2 can be intensively performed on the adjustment support device 1'. As a result, since it is not necessary to provide the machine learning device 100 for each industrial robot 2, it is possible to reduce the operation cost of the machine learning device 100.

Figure 10:
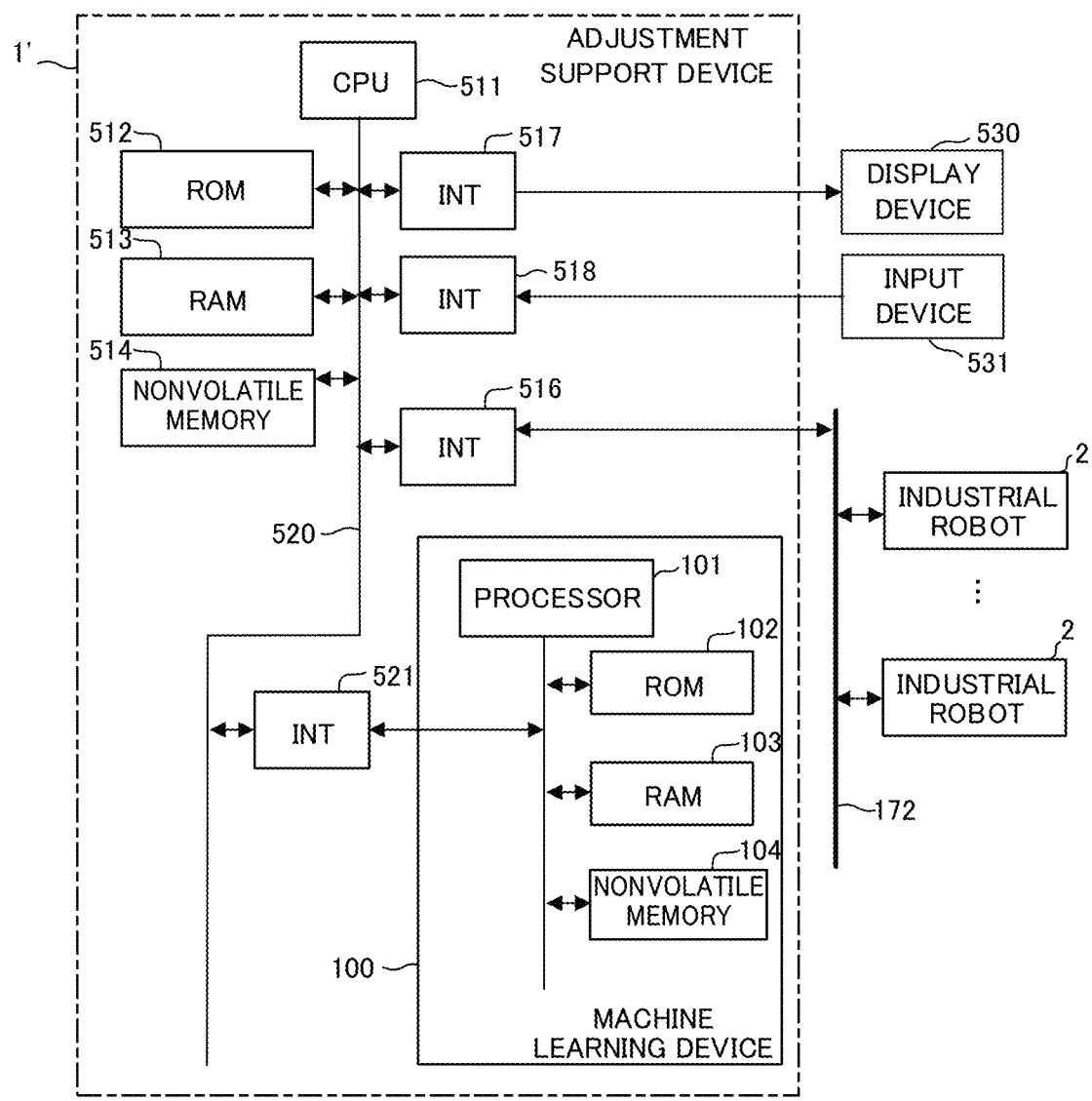
FIG. 10 is a schematic hardware configuration diagram of a computer according to an embodiment.

FIG. 10 is a schematic hardware configuration diagram of the adjustment support device 1' illustrated in FIG. 9.

A CPU 511 provided in the adjustment support device 1' is a processor that performs overall control of the adjustment support device 1'. The CPU 511 reads out a system program stored in a ROM 512 through a bus 520. The CPU 511 controls the entire adjustment support device 1' according to the system program. A RAM 513 temporarily stores temporary calculation data, various kinds of data input by an operator through an input device 531, and the like.

A nonvolatile memory 514 includes, for example, a memory backed up by a battery (not illustrated) and a solid state drive (SSD). The storage state of the nonvolatile memory 514 is maintained even when the power of the adjustment support device 1' is turned off. In the nonvolatile memory 514, a setting area for storing setting information relevant to the operation of the adjustment support device 1' is secured. The nonvolatile memory 514 stores data input from the input device 531, data acquired from each adjustment support device 1', data read through a network or an external storage device (not illustrated), and the like. Programs or various kinds of data stored in the nonvolatile memory 514 may be loaded to the RAM 513 at the time of execution/use. In addition, a system program including a known analysis program for analyzing various kinds of data is written in the ROM 512 in advance.

The adjustment support device 1' is connected to the network 172 through an interface 516. At least one industrial robot 2 or another computer is connected to the network 172, so that data is transmitted to and received from the adjustment support device 1'.

Data read into the memory and data obtained as an execution result of a program or the like are output to a display device 530 through an interface 517 and displayed on the display device 530. The input device 531 includes a keyboard, a pointing device, and the like. The input device 531 transmits commands, data, and the like based on the operation of the operator to the CPU 511 through an interface 518.

In addition, the machine learning device 100 has the same hardware configuration as that described with reference to FIG. 1.

While the embodiments of the present disclosure have been described above, the present disclosure is not limited to only the above-described embodiments, and can be implemented in various forms by making appropriate changes.

For example, in the above embodiments, the adjustment support device 1 and the machine learning device 100 are described as devices having different CPUs (processors). However, the machine learning device 100 may be achieved by the CPU 11 provided in the adjustment support device 1 and a system program stored in the ROM 12.

The invention claimed is:

1. An adjustment support device for supporting an adjustment of an operation of an industrial robot having a function of detecting a force and a moment applied to a manipulator, the device comprising:
   a learning model storage unit for storing, with force state data and position data in an operation when performing force control of the industrial robot as a state variable and with data indicating a result of determining whether a result of the force control performed under the state is success or failure based on predetermined criteria as determination data, a learning model generated by machine learning;
   an analysis unit for analyzing the learning model to analyze, for a control parameter used when the force control of the industrial robot has failed, an adjustment method of the control parameter for improving a degree of success of the force control; and
   an adjustment determination unit for determining, based on a result of the analysis by the analysis unit, an adjustment method of the control parameter in the force control used when the force control has failed and outputting the adjustment method.

2. The adjustment support device according to claim 1, wherein the control parameter adjustment method analyzed by the analysis unit includes at least an adjustment target and an adjustment direction of the control parameter.

* * * * *